Jan. 6, 1959 — L. V. A. GUILD — 2,867,488
KITCHEN ASSEMBLY
Filed June 2, 1952 — 7 Sheets-Sheet 3

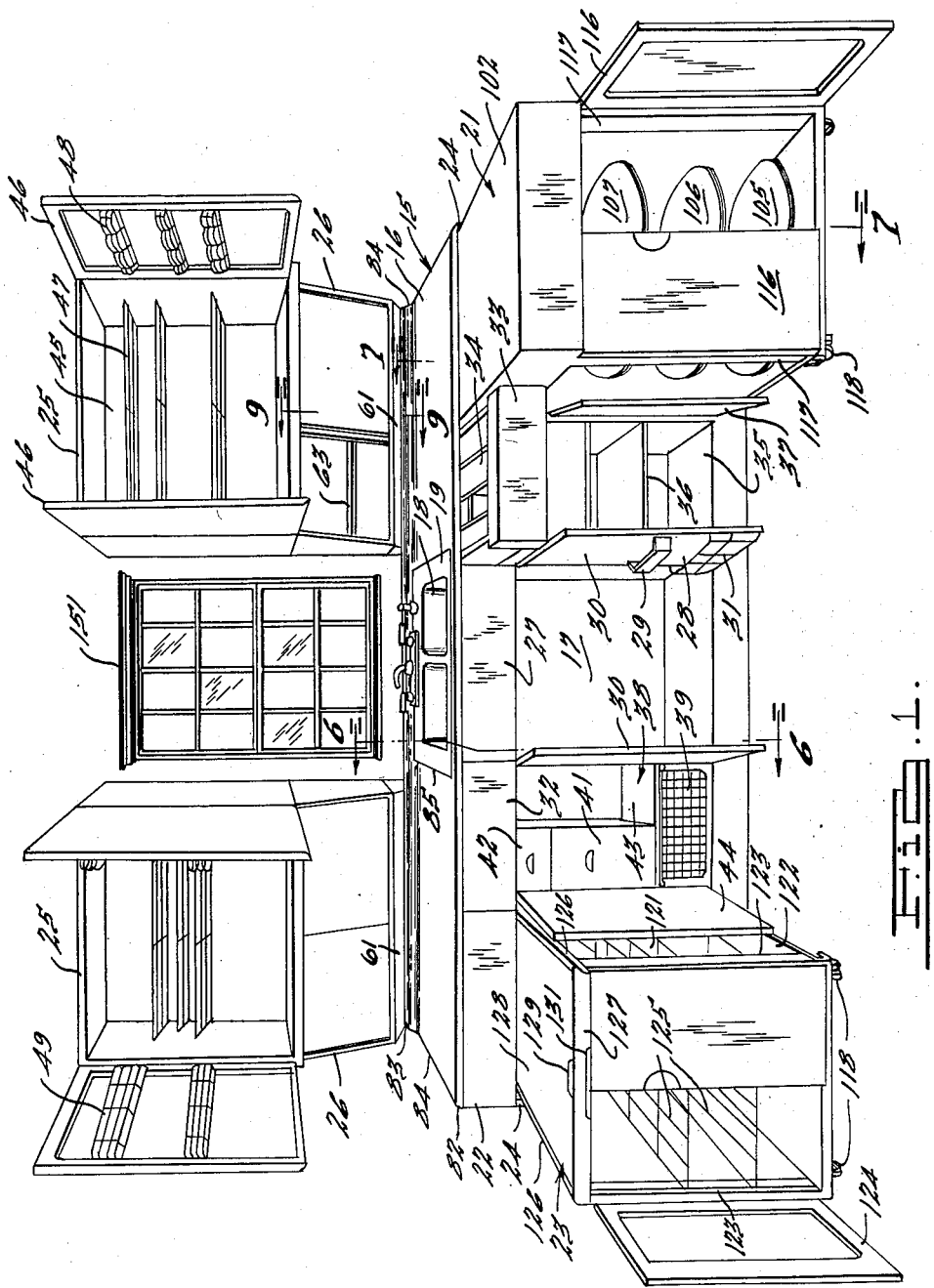

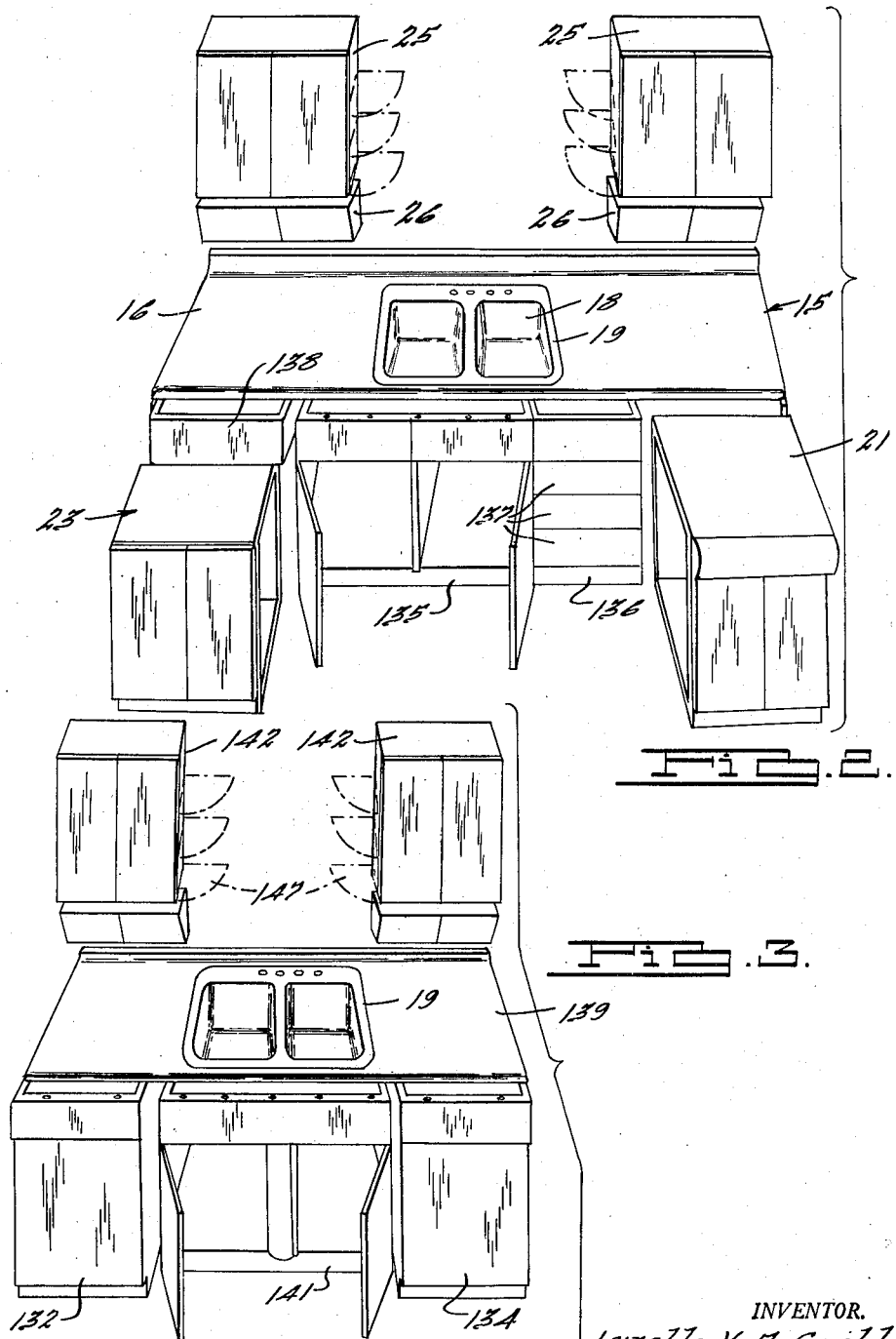

INVENTOR.
Lurelle V. A. Guild
BY
Harness, Dickey & Pierce
ATTORNEYS.

Jan. 6, 1959

L. V. A. GUILD 2,867,488

KITCHEN ASSEMBLY

Filed June 2, 1952

INVENTOR.
Lurelle V. A. Guild.
BY
Barnes, Dickey & Pierce.
ATTORNEYS.

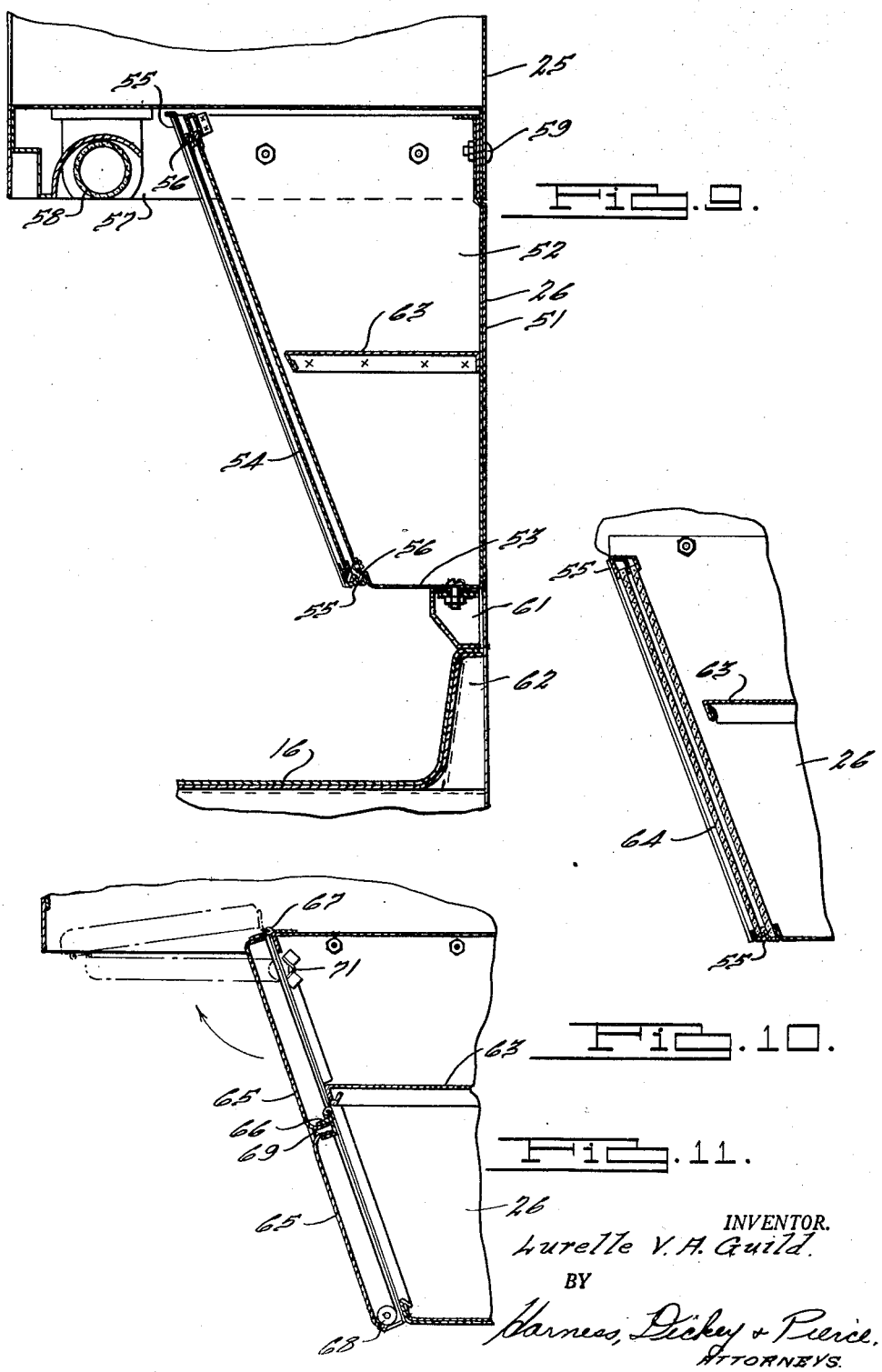

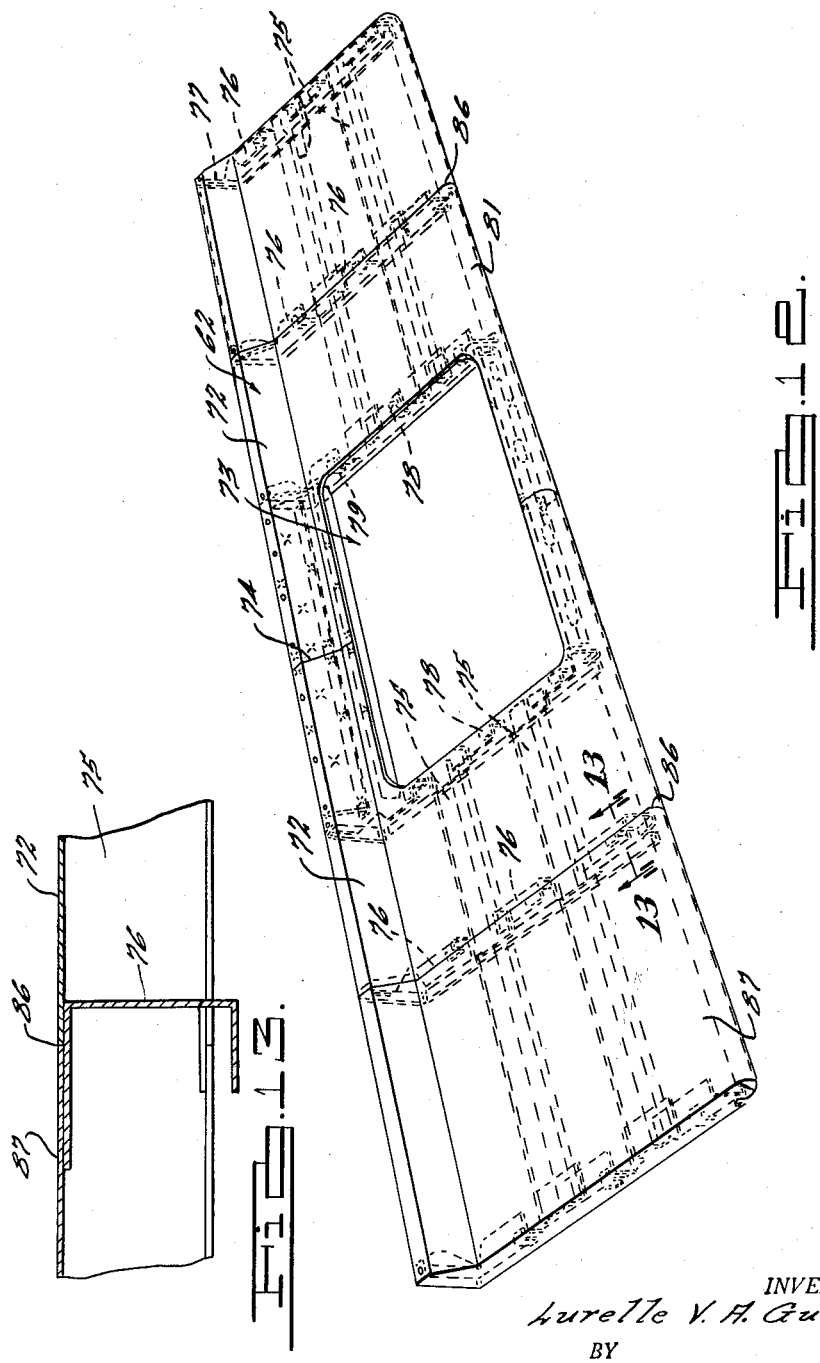

United States Patent Office 2,867,488
Patented Jan. 6, 1959

2,867,488

KITCHEN ASSEMBLY

Lurelle V. A. Guild, Darien, Conn., assignor to The Murray Corporation of America, Detroit, Mich., a corporation of Delaware Application June 2, 1952, Serial No. 291,221

3 Claims. (Cl. 312—107)

This invention relates to kitchen assemblies, and particularly to a kitchen unit assembled from cabinets and sink tops of different dimensions.

Kitchens provided in homes twenty or more years ago are obsolete and it is a practice in the art to modernize such kitchens which is done at a considerable cost. Many attempts have been made in the art to provide a kitchen package made up of cabinets and sink tops which could be sold as a unit, but because of the variation in the size of the kitchens and the position and size of windows and doors, the proposed fabricated kitchens did not meet the requirement in the trade. It was then attempted to form packages of different sizes, but this became so complicated and required such a large stock to be carried by a distributor that this plan proved unfeasible.

The present invention pertains to an assembled kitchen which may be formed in many sizes and shapes providing various types and utilities by incorporating in the assembly unit cabinets and sinks of usable sizes corresponding to those now warehoused by the dealer. By supplying very few specific pieces, many types of kitchen assemblies may be furnished without making the inventory carried by the dealer any substantial burden. For example, by supplying sink tops 5½ ft., 6½ ft., 7½ ft., and 8½ ft. in lengths, many combinations of kitchen assemblies may be built up by using stocked unit cabinets of both the under and over-sink types, having a single or double bowl sink. Special end cabinets may also be carried to replace the stocked unit cabinets which are movable out from under the counter top to provide additional work space; and, if desired, one or both of the movable cabinets may be moved entirely from beneath the counter top and away from the kitchen assembly to any other part of the kitchen to have counter space available at a point remote from the kitchen assembly.

Accordingly, the main objects of the invention are: to provide a plurality of counter tops which may be made into kitchen assemblies from cabinets which may be employed separately; to provide a kitchen assembly made up from counter tops and standard cabinets with end cabinets which may be pulled out from beneath the counter top so as to increase the counter top area; to provide a kitchen assembly with a counter top supported on individual cabinets, including a cabinet having a pulled-out section which increases the counter space and which, when provided with rollers, may be moved to points remote from the assembly, and, in general, to provide a kitchen assembly which is simple in construction, economical of manufacture, and capable of producing various types of kitchens without requiring a large stock of parts.

Other objects and features of novelty of the invention will be specifically pointed out or will become apparent when referring, for a better understanding of the invention, to the following description taken in conjunction with the accompanying drawings, wherein:

Figure 1 is a perspective view in elevation of a kitchen assembly, embodying features of the present invention;

Fig. 2 is an exploded view of structure, similar to that illustrated in Fig. 1, showing another form of the invention;

Fig. 3 is an exploded view of structure, similar to that ilustrated in Fig. 2, showing another form which the invention may assume;

Fig. 9 is an enlarged sectional view of the structure illustrated in Fig. 1, taken on the line 9—9 thereof;

Fig. 10 is a broken view of structure, similar to that illustrated in Fig. 9, showing another form of the invention;

Fig. 11 is a view of structure, similar to that illustrated in Fig. 9, showing a still further form which the invention may assume;

Fig. 12 is a perspective view of a counter top employed in the structures of the foregoing figures, and Fig. 13 is an enlarged sectional view of the structure illustrated in Fig. 12, taken on the line 13—13 thereof.

Figures 4, 5:
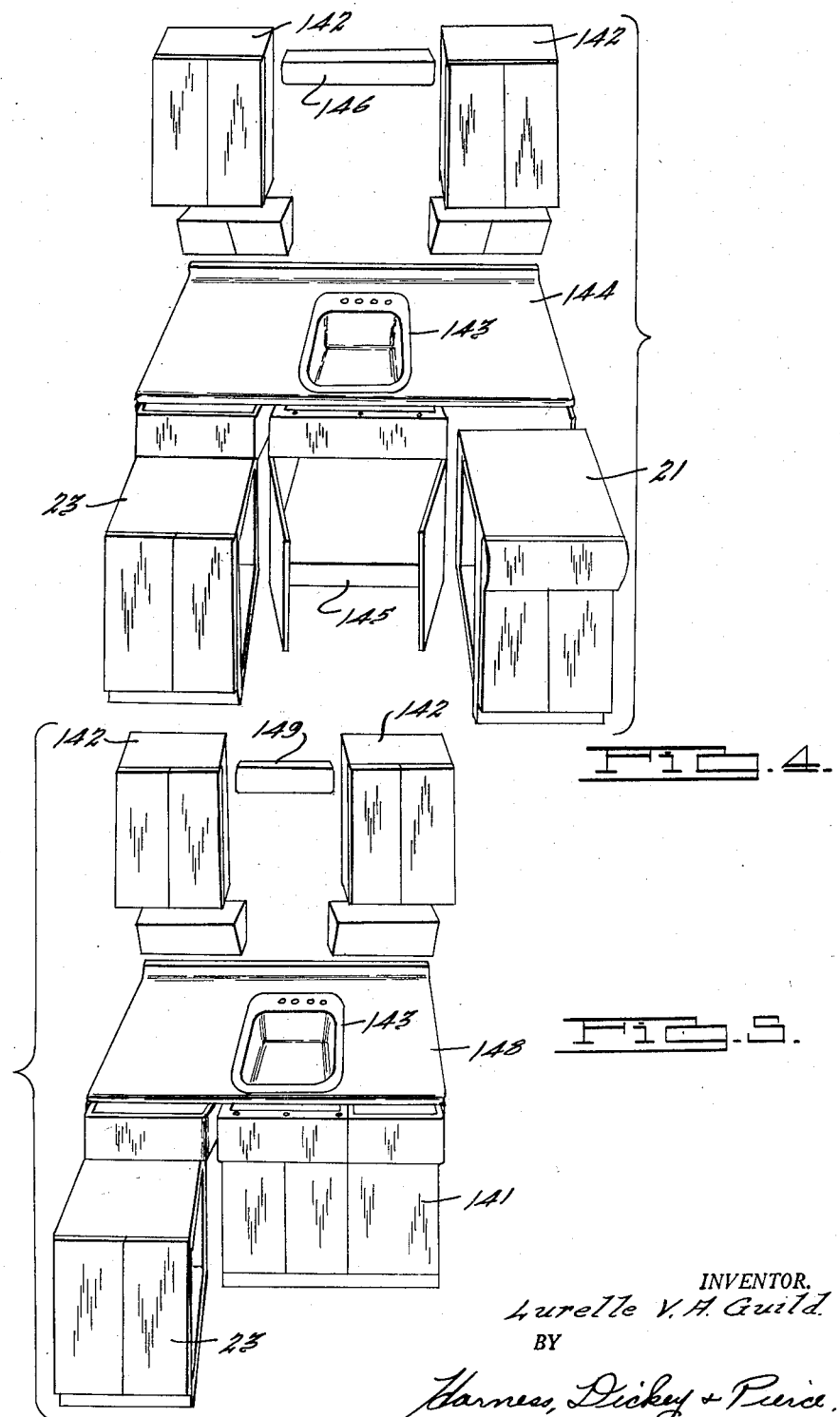
Fig. 4 is an exploded view of structure, similar to that illustrated in Fig. 3, showing a still further form of the invention.
Fig. 5 is an exploded view of structure showing a further form of kitchen assembly.

Referring particularly to Fig. 1, a cabinet assembly 15 is illustrated having a one-piece top 16 for the sink and working area. A central cabinet 17 of standard design is provided centrally of the top for supporting the top, the cabinet having provisions for the bowl unit 18 of the sink 19 which is mounted in the central portion of the top. The cabinet 17 may be employed with a standard top and bowl unit 18 and sold separately as a sink unit. At the right-hand end of the cabinet 17, a pull-out unit 21 is provided which will be described more fully hereinafter. This unit is substantially the height of the top and increases the counter top area when pulled out as illustrated in the figure. On the left-hand end of the top, a drawer 22 is mounted beneath which a pull-out unit 23 is provided which is offset downwardly from the main counter top to provide a lower working area in continuation of the counter top area. This unit will be more fully described hereinafter.

End panels 24 are mounted at each end of the assembly for enclosing the pull-out units 21 and 23 when retracted within the counter top area. Wall cabinets 25 are mounted on the wall above the counter top having condiment cabinets 26 mounted on the wall therebelow. The condiment cabinets may support the wall cabinets or may be directly secured to the wall or may be extended and attached to the splash back of the counter top so as to be supported thereby, as will be explained hereinafter. The cabinet 17 has a false front 27 to provide clearance for the bowl unit 18 of the sink 19, the area therebeneath being closed by a door 28, which area provides ample room for a garbage disposal device commonly employed with assemblies of the present type. The door may support a disposal container or may have a metal rack 29 and wire rack 31 mounted thereon. A drawer 32 and 33 is provided at each end of the cabinet 17, the drawer 33 having dividing partitions 34 therein to form the compartments for knives, forks, spoons and the like. A cabinet 35 is provided under the drawer 33 having shelves 36 therein enclosed by a door 37 hinged on the end wall of the cabinet. A compartment 38 is provided under the drawer 32, having a storage basket 39 in the bottom thereof, a bread box 41 thereabove, and a drawer 42 for condiments and the like above the bread box. A shelf 43 provides a compartment above the basket 39 at the side of the bread box 41 and drawer 42. A door 44 is hinged to the end of the cabinet for closing the compartment. A pair of doors 30 closes the central compartment beneath the sink.

The wall cabinets 25 are of conventional form, having a compartment 45 therein which is enclosed by a pair of hinged doors 46. Wire shelves 47 are provided within the compartment, and racks 48 are mounted on one of the doors 46 having a front scalloped wall for glasses. Racks 49 are supported on the door 46 for providing additional storage space. The shelves 47 and racks 48 and 49 are preferably made of wire and covered by a rubberlike composition which may be of any desired color to provide a pleasing appearance to the compartments 45 when the doors are opened.

Referring more specifically to Fig. 9, the condiment cabinet 26 is formed with a back wall 51, side walls 52, and a bottom wall 53. The side walls are narrow at the bottom and wide at the top, providing a front sloping surface to the cabinets which are closed by a pair of sliding panels 54. Double trackways 55 are supported at the top and bottom of the cabinet along the front edge thereof for receiving the edge elements 56 applied to the panels 54 which may be made of plastic or similar material which readily slide within the grooves in the guide members 55. The panels, when extended as illustrated in the left-hand cabinet 26 of Fig. 1, enclose the entire front face of the cabinet, and either of the panels may slide over the other one, as illustrated in the right-hand cabinet 26 of Fig. 1, to render one-half of the cabinet accessible. In this arrangement, it will be noted that the top edge of the cabinet 26 is spaced rearwardly of the front edge of the cabinet 25 providing a space 57 in which a fluorescent light fixture 58 may be mounted for illuminating the cabinet 26 and the counter top 16 of the kitchen assembly. It will be noted further that a plurality of bolts 59 are utilized for securing the cabinet 26 directly to the cabinet 25. Further, it will be noted that a supporting bar 61 is secured to the bottom wall 53 of the cabinet 26 in position to rest upon the top of the splash back portion 62 of the counter top 16. Some of the support for the cabinets 25 is taken by the splash back portion 62 of the counter top and the bars 61 which connect the cabinets in unit relation with the counter top. A shelf 63 may be provided in the cabinet 26 midway between the top and bottom thereof, as illustrated in the drawings.

In Fig. 10 a similar condiment cabinet 26 is illustrated, that wherein the panels 64 are of glass which may be clear so that the condiment containers within the cabinet may be directly viewed through the panels, or which may be opaque so that the containers may be hidden thereby. In such a relation, the glass directly engages the grooves of the guide elements 55 and the edge elements 56 on the panels 54 are thereby omitted.

In Fig. 11 a still further form of closure is illustrated for the condiment cabinet 26, that embodying a pair of panels 65 which are hinged together transversely of the cabinets by the hinge elements 66, with the top panel secured to the top of the cabinet by hinge elements 67. The panel 65 at the bottom is provided with a roller 68 on each of its bottom side edges which operates in a track 69 along each front edge of the cabinet to retain the bottom edge of the panel against the face of the cabinet when in closed position and for causing the panels to fold, as illustrated in dot and dash lines in the figure, when the lower panel is raised. A notch 71 is provided in the trackway 69 for receiving the rollers 68 when the panels are in raised position for retaining the panels in such position.

The counter top 16, as illustrated in Fig. 12, comprises a pair of panel elements 72 which are joined centrally of the sink openings 73 along the line 74. The panels are reinforced by a plurality of longitudinally extending members 75 which are interrelated with a plurality of transversely extending members 76 of right and left-hand construction, as illustrated in the figure. The transverse members 76 have upstanding portions 77 at the rear which form with the panel 72 the foundation for the splash back portion 62 of the counter top. All of the elements are welded together to form a unit construction. Flanges 78 are provided about the sink openings 73 and the adjacent transverse members 76 have apertures 79 through the vertical wall thereof through which clamp-down elements, commonly employed in the art, are utilized for bolting down the sink within the opening. The front edge of the panels 72 is rolled back upon itself to provide a downwardly curved edge 81 to the counter top. The entire surface of the panels 72 is then covered with suitable cover material and trim strips 82 and 83 are provided at the front and top edges of the counter top and splash back, respectively, while end strips 84 trim the end surfaces of the counter top. Similar trim strips 85 are provided about the edge of the sink 19, and in this manner the material applied to the top of the panels 72 has the edges covered by the trim strips 82, 83, 84 and 85.

It will be noted in Figs. 12 and 13 that panels 72, instead of extending from the center of the sink opening 73 to the end of the counter top, may extend from the sink opening only to the line 86 and end panels 87 provided at each end thereof to make the large counter top illustrated in the figure. When one of the panels 87 is omitted, a shorter counter top is thereby provided, and when both of the end panels 87 are omitted, a still shorter counter top will be constructed, for a purpose which will be explained hereinafter.

Figure 6:
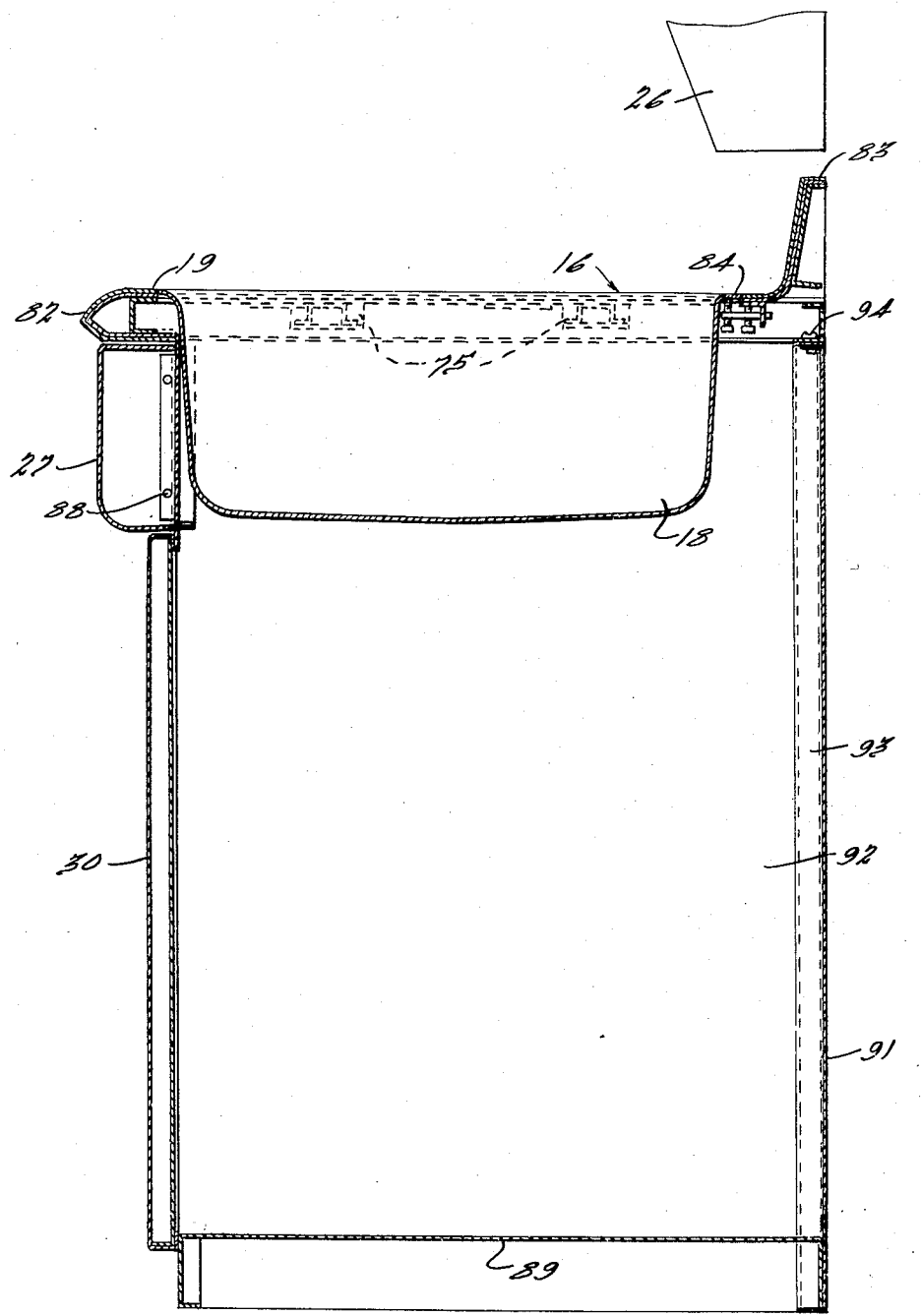
Fig. 6 is an enlarged, sectional view of the structure illustrated in Fig. 1, taken on the line 6—6 thereof.

In Fig. 6 a section of the counter top and cabinet assembly is illustrated, that wherein the sink 19 has the bowl unit 18 extending downwardly within the cabinet, with the false drawer front 27 secured by bolts 88 to the cabinet frame. The cabinet is of conventional construction, having a floor portion 89, a rear wall portion 91, and side walls 92, all of which are mounted on a frame 93 and to which the pair of doors 30 is hinged. The counter top 16 is secured to the frame by suitable bolts 94.

Figure 7:
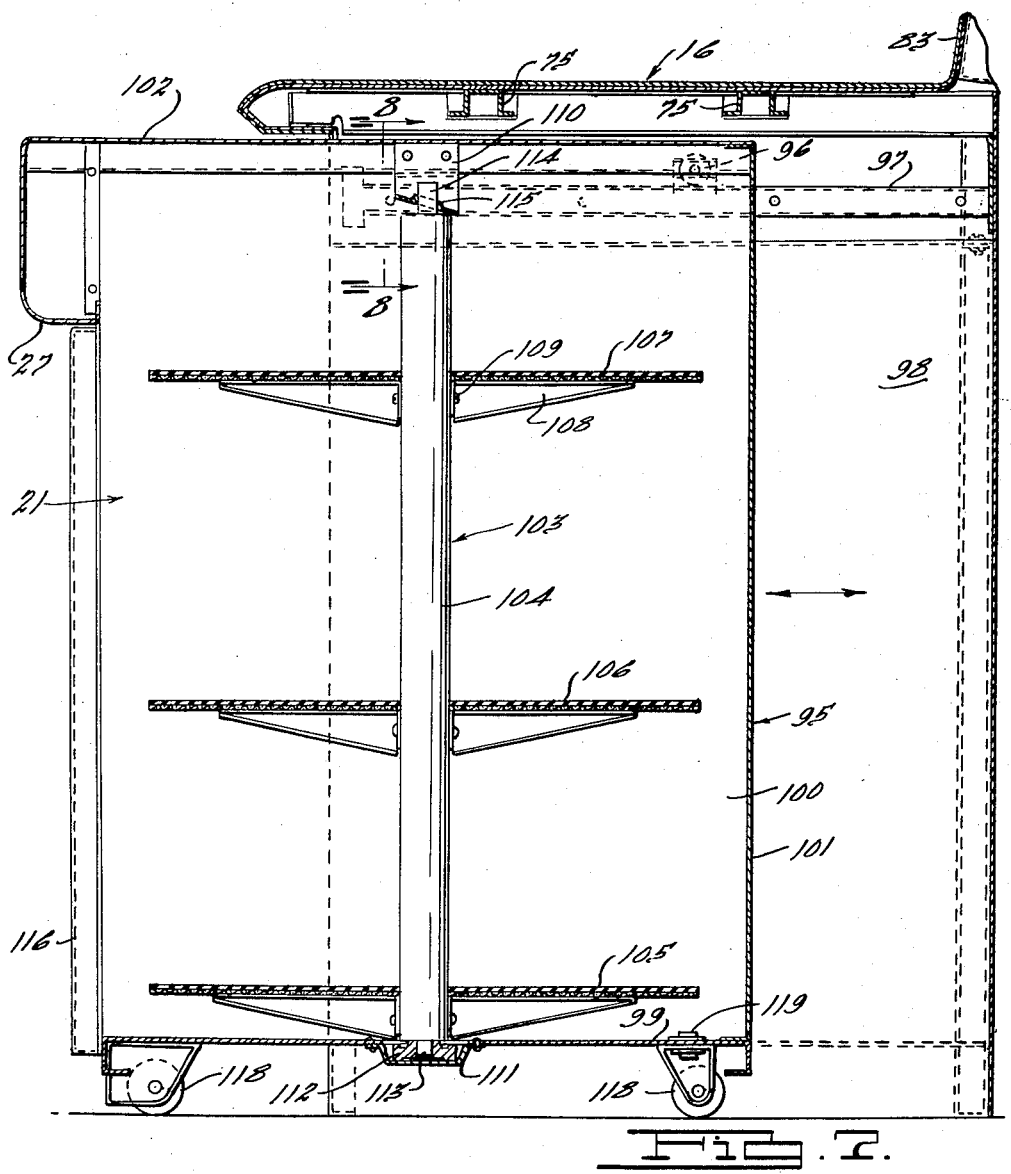
Fig. 7 is an enlarged sectional view of the structure illustrated in Fig. 1, taken on the line 7—7 thereof.
Figure 8:
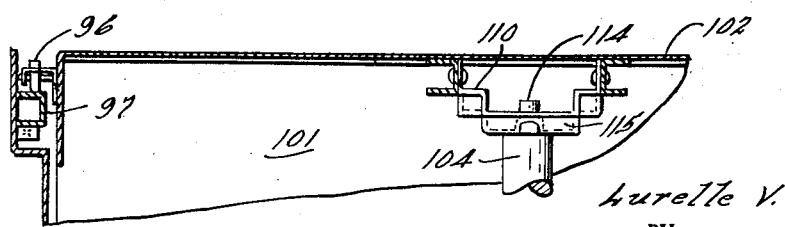
Fig. 8 is a broken sectional view of the structure illustrated in Fig. 7, taken on the line 8—8 thereof.

Referring to Figs. 1, 7 and 8, a pull-out cabinet 21 at the right of the assembly, as illustrated in Fig. 1, is a self-contained unit embodying a cabinet 95 which has a roller 96 at each of its sides near the top, near the center and the rear end which operates on tracks 97 on the end walls defining a recess 98. The recess is formed by the end wall of the central cabinet 17 and the end panel 24 provided at each end of the assembly. The cabinet 95 is of conventional form, having a bottom 99 supporting a side wall 100 and a rear wall 101. A top panel 102 forms the counter top for the cabinet 95, providing additional work area when the cabinet is withdrawn from the compartment. The panel 102 may be finished in any manner, as by porcelain enameling, or by applying counter top material thereto, as practiced in the art. Within the cabinet 95, a rotatable rack 103 is provided embodying a central pillar 104 on which the three circular racks 105, 106 and 107 are mounted. The racks are made of wire and braced by a plurality of stamped gusset plates 108 secured to the central pillar by screws 109. A cup 111 is mounted beneath the bottom wall 99 of the cabinet, having therein a bearing element 112 of plastic or other material on which the end of the pillar 104 rotates. The bearing element 112 has the central aperture in which a projecting stud 113 on the pillar extends for maintaining the pillar aligned centrally of the cabinet. An extending stud 114 is provided at the top of the pillar which projects through a flanged aperture 115 in a bracket 110 secured at the top of the cabinet. The portion of the bracket containing the aperture slopes to permit the pillar 104, after being raised to have the stud 113 move out of the bearing element 112, to be tilted so that the stud 114 can be withdrawn from the flanged aperture 115 and the racks removed from the cabinet. A false front 27 may be applied to the front top edge of the cabinet in aligned relation with the door fronts and the false front 27 opposite to the sink 19 in the assembled cabinets. A pair of doors 116 is hinged to the pillar portion 117 at the front of the cabinet 95 which leaves the front and one side of the pull-out cabinet 95 open when the doors 116 are opened. In such an arrangement, when the cabinet is withdrawn to increase the working area of the counter top 16, the articles on the shelves 105, 106, 107 are made available from the inner side and front of the cabinet. By having the shelves mounted for rotation, any article thereon may be removed from the one side and front face of the cabinet. If desired, the side panel 100 may be omitted so that the shelves are accessible from both sides of the cabinet.

For supporting the front of the cabinet, a pair of rollers 118 is provided, one mounted at each front corner thereof, is illustrated in Figs. 1 and 7. A single roller 118 may be mounted centrally of the cabinet along the rear edge thereof in caster relationship to a pivot 119 which permits the support for the wheel 118 to pivot and guide the cabinet movement. With such an arrangement, the cabinet 95 may be entirely withdrawn from the recess 98 and moved to any part of the room adjacent to a table, stove or refrigerator for providing working area adjacent thereto.

Referring to Fig. 1, the top pull-out cabinet 23 is similar to the cabinet 21, with the exception that it is lower, fitting beneath the drawer 22 of the kitchen assembly. A recess opening is provided at the left-hand end of the cabinet 17 enclosed by the end wall 24 of a size to receive the cabinet 23. The cabinet has a rear wall 121, a bottom wall 122, and front pillars 123 on which a pair of doors 124 is pivoted. A plurality of shelves 125 are provided within the cabinet, the objects thereon being accessible from each side and the front when the cabinet is withdrawn from the recess and the doors are open. The top of the cabinet consists of two frame members 126 forming a ledge with the front cross bar 127 and the rear wall, upon which a cutting board 128 is removably mounted. A hand hole 129 is provided on the board so that it may be grasped and removed. A similar hand hole 131 is provided in the front bar 127 for pulling the cabinet forwardly out of the recess. The working board 128 forming the top of the cabinet provides additional working surface, and the three wheels 118, as provided on the cabinet 21 above described, may also be mounted on the bottom of the cabinet 23 so that it may be partially or completely withdrawn from the recess. A roller 96 is mounted on the side of the cabinet near the rear thereof to operate on a track 97 mounted on the side walls forming the recess. In this arrangement, substantial working area is provided in the extension of the counter top 16 by the top 102 of the cabinet 21 and the cutting board 128 of the cabinet 23 when the cabinets are pulled outwardly from the respective recesses. By having the sides of the cabinets open, the materials supported on the shelves within the cabinets are accessible from the front and both sides thereof. By mounting the cabinets on the three wheels, the cabinets may be completely withdrawn from the recesses and moved to any part of the kitchen.

It is within the purview of the present invention, when the pull-out types of cabinet 21 and 23 are not desired, and when a cheaper type of kitchen assembly is to be provided, to substitute for the cabinets 21 and 23 standard cabinets of the same height and width now manufactured to cooperate with the central cabinet 17.

Referring to Fig. 3, a cabinet 132 is illustrated of standard type, having a bottom wall, two side walls, a rear and a top drawer, and a pair of doors in the front, with a shelf on the interior, all of which is standard construction and of the same dimension as the cabinet 23 so that it may be substituted therefor. Similarly, a standard cabinet 133 is illustrated, having a drawer 134 therein which may be substituted for the cabinet 21 in the arrangement illustrated in Fig. 1. Similarly, in Fig. 3 either one or both of the cabinets 132, 133 may have the cabinet 23 or 21 substituted therefor in the assembly.

Referring to Figs. 2, 3, 4 and 5, different kitchen assemblies are illustrated which may be built up from standard cabinet units assembled with one of four lengths of tops which are provided. In Fig. 2, an 8½ ft. counter top 16 is illustrated mounted on cabinets, which provides substantially the same arrangement of elements as illustrated in Fig. 1. The various sections are exploded so that each unit is separate and embodies the counter top 16 and a cabinet 135 which is disposed beneath the sink 19 to receive the bowl units 18 thereof. A second standard cabinet 136 is herein illustrated as being provided with a plurality of drawers 137. A drawer 138 is provided for the left-hand end of the counter top 16 beneath which a cabinet 23 is mounted or a unit cabinet 132 may be provided. A cabinet 133 or 21 similarly may be provided on the right-hand end of the counter top 16. The wall cabinets 25 and 26 are similar to those hereinabove described with relation to the kitchen assembly of Fig. 1.

In Fig. 3 a counter top 139 is illustrated, similar to the counter top 16 with the exception that it is one foot shorter, being 7½ ft. in length. In this arrangement, the cabinet 136 is eliminated and a standard cabinet 141 is provided beneath the sink 19. This cabinet is 42" in width, while the cabinets 132 and 133, or cabinets 21 and 23 which may be substituted therefor, are 24" in width, the sum of which equals the 7½ ft. length of the counter top 139. The cabinet 136 of the assembly illustrated in Fig. 2 is one foot in width, the sum of the assemblies equaling the length of the counter top which is 8½ ft. In the arrangement of Fig. 2, the wall cabinets 25 and 26 are 30" in width, although it is to be understood that any width of cabinet or a multiple of cabinets may be provided within the counter top. In the structure illustrated in Fig. 3, the wall cabinets 142 are preferably 24" in width, but it is to be understood that the entire wall may be filled up with cabinets of the 24" or other dimension.

In Fig. 4 a sink 143 is of the single-bowl type and is mounted in a counter top 144 which is 6½ ft. in length. In this arrangement, the central standard cabinet 145 is 30" in width which, when added to the cabinet 21 or 133 or 23 or 132 of 24" width, equals the 6½ ft. length for the counter top. In the arrangement illustrated in Fig. 5, a 42" standard cabinet 141 is provided beneath the sink 143 which is mounted on a counter top 148 having a length of 5½ ft. Any one of the cabinets 21, 23, 132, or 133 may be mounted on the left-hand side of the cabinet 141. The 24" wall cabinets 142 are illustrated as being provided above the sink, with a fluorescent light 149 mounted therebetween, or a plurality of the wall cabinets of the same or different sizes may extend entirely across the counter top area. It will be noted in Fig. 1 that the cabinets 25 are disposed on each side of the window 151, but in this and other assemblies the wall space may be filled with the wall cabinets. By providing counter tops of different lengths, many designs of kitchen assemblies may be built up from standard cabinets alone or combined with one or both of the pull-out cabinets 21 and 23.

Through the provision of standard 24", 30", 42" and 54" below-counter top cabinets, and when utilizing in place of the 132 and 133 cabinets the pull-out type of cabinets 21 and 23, a large number of under sink cabinet assemblies may be provided, having a length of from 5½ ft. to 8½ ft. When counter tops greater than 8½ ft. in length are employed, more of the under-sink cabinets may be applied thereto. Similarly, standard types of wall cabinets may be provided for the assembly above the sink, and these are preferably used in combination with standard lengths of condiment cabinets which may be secured thereto in unit relation or which may be applied separately to the wall.

The pull-out type of cabinets employed at one or both ends of the counter tops are unique in extending the counter top surface forwardly thereof and in having one or both side walls eliminated so that any article within the cabinets is readily accessible. The cabinets are guided within the recess by rollers in the rear thereof which operate on tracks at the sides of the recess and which are supported at the front end by a pair of wheels. By utilizing a caster wheel at the center of the rear bottom edge of the cabinet, the cabinet may be pulled entirely from the recess and moved to any position within the kitchen to have the counter top space and the elements within the cabinet available at that point.

The kitchen assemblies herein described are unique in that they were constructed from standard cabinets, thereby eliminating the large inventory which otherwise must be carried by one supplying kitchen assemblies in the trade. All of the wall and under sink cabinets are of standard design except the pull-out types, but these are so constructed that they can be substituted for a standard type of cabinet. With the pair of the pull-out types of cabinets, standard wall and under sink cabinets, and the four lengths of tops, a dealer may provide a number of different types of kitchen assemblies. By reducing the special inventory to be carried in this manner, it was found feasible for the dealer to carry sufficient stock to provide the kitchen assemblies since they incorporate standard units normally carried by the dealer.

What is claimed is:

1. A pull-out type of cabinet for a kitchen assembly embodying a cabinet unit which is open at the front, a pull-out unit embodying a frame structure including a floor panel, a rear panel and a top panel, door means for enclosing the front of said frame structure, wheels on the front and rear of said frame structure for permitting the pull-out unit to be drawn outwardly from the front opening in the cabinet unit, shelves provided within said said pull-out unit, and slide elements on said cabinet and pull-out unit for releasably limiting the outward movement of said unit.

2. A pull-out type of cabinet for a kitchen assembly embodying a cabinet unit which is open at the front, a pull-out unit embodying a frame structure including a floor panel, a rear panel and a top panel, door means for enclosing the front of said frame structure, wheels on the front and rear of said frame structure for permitting the pull-out unit to be drawn outwardly from the front opening in the cabinet unit, shelves provided within said pull-out unit, said shelves being mounted on a central rotatable column permitting the shelves to rotate within the frame structure, and slide elements on said cabinet and pull-out unit for releasably limiting the outward movement of said unit.

3. A pull-out type of cabinet for a kitchen assembly embodying a cabinet unit which is open at the front, a pull-out unit embodying a frame structure including a floor panel, a rear panel and a top panel, door means for enclosing the front of said frame structure, wheels on the front and rear of said frame structure for permitting the pull-out unit to be drawn outwardly from the front opening in the cabinet unit, and shelves provided within said frame structure, said top panel being a cutting board supported on the top of said frame structure which is removably mounted thereon.

References Cited in the file of this patent

UNITED STATES PATENTS

| | | |
|---|---|---|
| 313,768 | Pringle et al. | Mar. 10, 1885 |
| 842,780 | Gardner | Jan. 29, 1907 |
| 1,047,843 | Schaffert | Dec. 17, 1912 |
| 1,086,769 | Hick | Feb. 10, 1914 |
| 1,199,523 | Bosworth | Sept. 26, 1916 |
| 1,942,856 | Davis | Jan. 9, 1934 |
| 2,059,994 | Williams | Nov. 3, 1936 |
| 2,162,012 | Herrin | June 13, 1939 |
| 2,191,116 | Osuch | Feb. 20, 1940 |
| 2,244,950 | Jones | June 10, 1941 |
| 2,328,129 | Earle | Aug. 31, 1943 |
| 2,466,869 | Triller | Apr. 12, 1949 |
| 2,521,765 | White | Sept. 12, 1950 |
| 2,550,539 | Earle | Apr. 24, 1951 |

FOREIGN PATENTS

| | | |
|---|---|---|
| 26,019 | Great Britain | 1907 |
| 122,899 | Norway | Oct. 5, 1948 |